United States Patent [19]
Kondo

[11] 4,126,870
[45] Nov. 21, 1978

[54] AUTOMATIC FOCUSING DEVICE
[75] Inventor: Toshihiro Kondo, Chofu, Japan
[73] Assignee: Fuji Photo Film Co., Ltd., Minami-ashigara, Japan
[21] Appl. No.: 833,578
[22] Filed: Sep. 15, 1977
[30] Foreign Application Priority Data
  Nov. 30, 1976 [JP] Japan ................. 51-143844
[51] Int. Cl.² ............................................. G03B 7/08
[52] U.S. Cl. ..................................................... 354/25
[58] Field of Search .................. 354/25, 31; 352/140; 355/56; 250/201, 204; 356/4

[56] References Cited
U.S. PATENT DOCUMENTS
| | | | |
|---|---|---|---|
| 3,682,071 | 8/1972 | Hosoe | 354/25 |
| 3,953,863 | 4/1976 | Lang | 354/25 |

*Primary Examiner*—Michael L. Gellner
*Attorney, Agent, or Firm*—Gerald J. Ferguson, Jr.; Joseph J. Baker

[57] ABSTRACT

A beam splitter is provided in the optical path of an objective of a camera or the like to divide the light beam into two light beams. At least in one of the divided light beams is inserted a wedge type prism to shift the image viewed from therebehind when the image is not focused precisely on the prism. At optically conjugate positions in the divided light beams are located photodetectors to receive light. The outputs of the photodetectors are connected with an A.C. component detecting circuit by way of an alternating switching circuit so that an A.C. component of the output of the switching circuit may be detected when the outputs of the photodetectors are different from each other. When the image is focused precisely on the prism, the outputs of the photodetectors become equal to each other and the output of the alternating switching circuit does not have an A.C. component. A servomotor for controlling the position of the objective is connected with the A.C. component detecting circuit by way of an electric control circuit so that the objective is stopped at the position where the A.C. component of the output of the alternate switching circuit is zero.

9 Claims, 6 Drawing Figures

AUTOMATIC FOCUSING DEVICE

BACKGROUND OF THE INVENTION

1. Field of the Invention

This invention relates to an automatic focusing device for a camera or the like, and more particularly to a device for automatically focusing an image on a predetermined position by use of an optical refractive element stationarily provided in the optical system of the camera or the like.

2. Description of the Prior Art

There have been known various types of automatic focusing device for a camera or the like. The conventional automatic focusing device employs a photodetector located in a plane on which an image should be focused by an objective and moves the objective back and forth along its optical axis in accordance with an outputted of the photodetector. The output of the photodetector shows a maximum value when the image is focused precisely on thereon.

The conventional automatic focusing device as described above is disadvantageous in that the change in output of the photodetector is slow and the focusing operation is accordingly slow. Particularly because the focus detection is conducted by detecting a maximum output, the objective must be moved back and forth to find the maximum value. In other words, it is impossible or very difficult to know if the image is focused at any position on the optical axis of the objective.

SUMMARY OF THE INVENTION

In view of the above defects inherent in the conventional device, it is the primary object of the present invention to provide an automatic focusing device for a camera or the like in which the focusing is quickly conducted.

It is another object of the present invention to provide an automatic focusing device for a camera or the like in which it is possible to know if the image is focused at any position on the optical axis of an objective.

It is still another object of the present invention to provide an automatic focusing device for a camera or the like which is compact in size and can be manfactured at a low cost.

The automatic focusing device in accordance with the present invention employs a beam splitter behind an objective to divide a light beam from the objective into two light beams, a pair of photodetectors provided in the two light beams respectively at optically conjugate positions and an optical refractive element inserted in one of the divided light beams. The optical refractive element is located substantially at a position where the image should be focused by the objective so that the relative position of the image focused on one of the photodetectors with respect to the optical axis of one light beam is the same as that of the image focused on the other photodetector with respect to the optical axis of the other light beam when the image is focused precisely on the optical refractive element. When the image is out of focus on the optical refractive element, the position of the image formed on one of the photodetector relative to the optical axis is different from the position of the image formed on the other photodetector relative to the optical axis. The outputs of the two photodetectors are alternately transmitted to an A.C. component detecting circuit by way of a change-over switching circuit. The A.C. component detecting circuit receives the two outputs alternately. Therefore, when the two outputs are not equal to each other, the input of the detecting circuit includes an alternating current component and when they are equal the input is a direct current. Thus, an A.C. component of the input of the detecting circuit represents the non-focusing condition. When the A.C. component thereof becomes zero, it indicates that the image is focused precisely on the optical refractive element. Therefore, by positioning a photographic film or a plane on which an image should be focused at a position optically conjugate with the optical refractive element the focusing position of the objective can be known by the output of the detecting circuit. An objective moving means which slides the objective back and forth along the optical axis thereof is connected with the detecting circuit so that the objective is stopped at the position where the output of the detecting circuit is zero, namely the A.C. component of the input thereof is zero.

DESCRIPTION OF THE PREFERRED EMBODIMENTS

Figure 1:
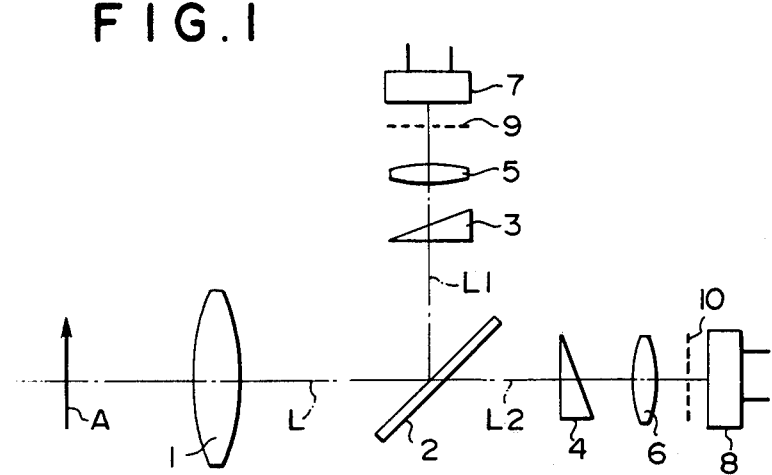
FIGS. 1 to 4 are diagrams showing various embodiments of the optical system which can be employed in the present invention.

Referring to FIG. 1 which shows an embodiment of an optical system employed in the automatic focusing device of the present invention, a light beam L along an optical axis of an objective 1 is divided into two light beams L1 and L2 by a beam splitter 2 constituted of a half transparent mirror. In the light beams L1 and L2 are inserted optical refractive elements 3 and 4, respectively. The optical refractive elements 3 and 4 are, in this embodiment, optical wedge type prisms which refract the light beam incident thereto into different directions with respect to the image formed thereon by the objective. The image formed by the objective 1 is focused in the vicinity of the prisms 3 and 4, which are located in optically conjugate positions. While one prism 3 deflects the light in one direction with respect to the image formed, the other prism 4 deflects the light in the opposite direction with respect to the image. Behind the prisms 3 and 4 are located focusing lenses 5 and 6, respectively, to focus the image once focused on the prisms 3 and 4 onto photodetectors 7 and 8 respectively provided behind the focusing lenses 5 and 6. Between the focusing lenses 5, 6 and the photodetectors 7, 8 are respectively provided slit plates 9 and 10 having a number of slits. The slit plates 9 and 10 are positioned at optically conjugate positions with respect to each other. The corresponding slits in the slit plates 9 and 10 should be at precisely optically conjugate positions.

In the optical system as shown in FIG. 1, the image of an object A is focused in the vicinity of the prisms 3 and 4. When the images are focused precisely on the prisms 3 and 4, the images are focused on the photodetectors 7 and 8 at optically conjugate positions since the prisms 3 and 4 do not affect the relative position of images focused on the photodetectors 7 and 8. Therefore, in this case, the outputs of the two photodetectors 7 and 8 are equal to each other.

On the other hand, when the images are not focused precisely on the prisms 3 and 4, the prisms 3 and 4 effect to deflect the image focusing light beams in different directions. Therefore, the relative position of the image focused on one photodetector 7 becomes different from that of the image focused on the other photodetector 8. Consequently, the amount of light received by one photodetector 7 through the slit plate 9 becomes different from that received by the other photodetector 8 through the slit plate 10, and the outputs of the photodetectors 7 and 8 become different from each other.

Therefore, by taking up the outputs of the two photodetectors 7 and 8 alternately, the focusing condition can be known by the existence or non-existence of an alternating current component in the alternately taken up output of the two photodetectors 7 and 8. When the image is not focused on the prisms 3 and 4, the output which combines the two outputs involves an alternating current component. When the image is focused, the alternating current component disappears.

In the above described embodiment, the slit plate 9 and 10 are utilized for enhancing the sensitivity of the detecting circuit. Thus, these slits 9 and 10 are not an essential element of the invention and may be omitted.

Further, in the above described embodiment, optical refractive elements 3 and 4 are inserted respectively into light beams L1 and L2 behind the beam splitter 2. However, only one optical refractive element need be inserted in only one light beam behind the beam splitter 2.

Figure 2:
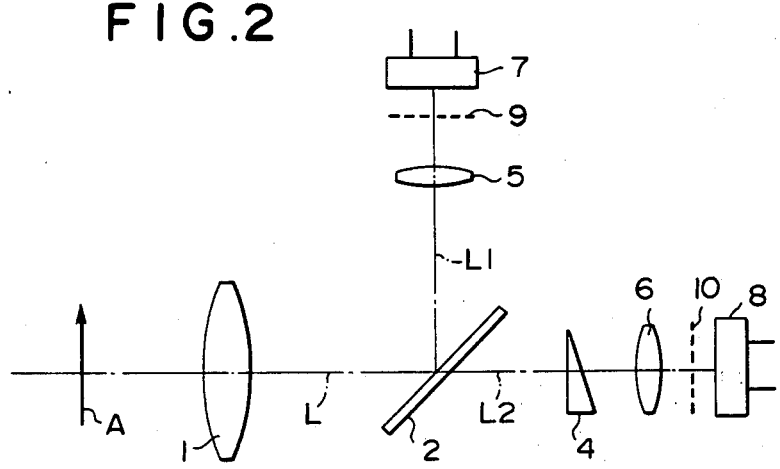

FIG. 2 shows another embodiment in which only one prism 4 is inserted between the beam splitter 2 and the focusing lens 6. In FIG. 2, all the elements equivalent to those shown in FIG. 1 are designated with the same reference numerals. In the embodiment shown in FIG. 2, one light beam L1 behind the beam splitter 2 is not provided with a prism. Therefore, the position of the image focused on the photodetector 7 does not change when the objective 1 moves back and forth along the optical axis thereof. Only on the photodetector 8 does the position of the image focused change as the objective 1 moves back and forth. In this embodiment, the difference in position of the images between the photodetectors 7 and 8 is small in comparison with the above embodiment shown in FIG. 1. On the other hand, however, the structure of the optical system is simple and the manufacture thereof is facilitated in this embodiment.

Figure 3:
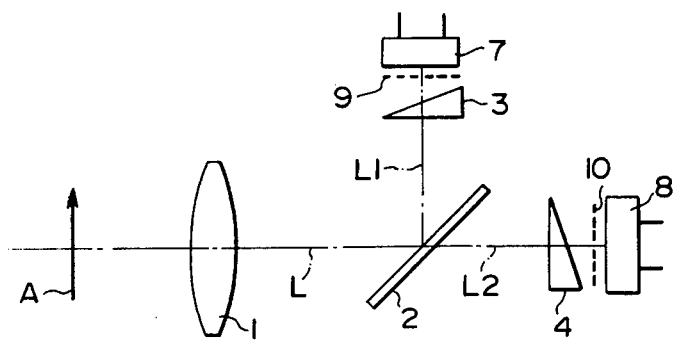

In the above two embodiments, focusing lenses 5 and 6 are inserted between the prisms 3 and 4 and the photodetectors 7 and 8 to focus an image which is once focused on the focal plane of the objective 1 onto the photodetectors 7 and 8. However, the focusing lenses 5 and 6 may be omitted by locating the photodetectors 7 and 8 and the slit plates 9 and 10 close to the prisms 3 and 4, respectively, as shown in FIG. 3.

Figure 4:
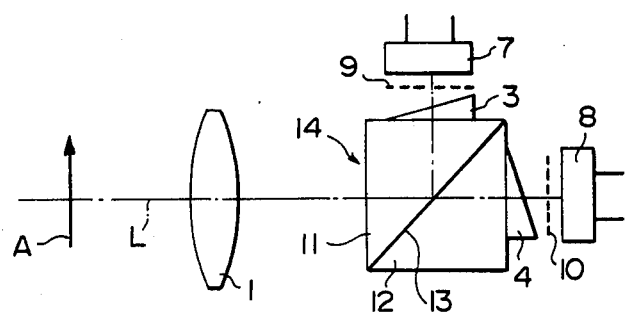

In the above three embodiments, a half transparent mirror is used as the beam splitter 2. However, as shown in FIG. 4, a cemented prism assembly 14 consisting of two rectangular prism blocks 11 and 12 and having a beam splitting boundary face 13 may be used instead thereof. In the embodiment shown in FIG. 4, prisms 3 and 4 are cemented to the exit faces of the prism assembly 14. The prisms 3 and 4 may be integrally formed with the prism blocks 11 and 12. In this embodiment, positioning of the prisms 3 and 4 is facilitated.

Figure 5:
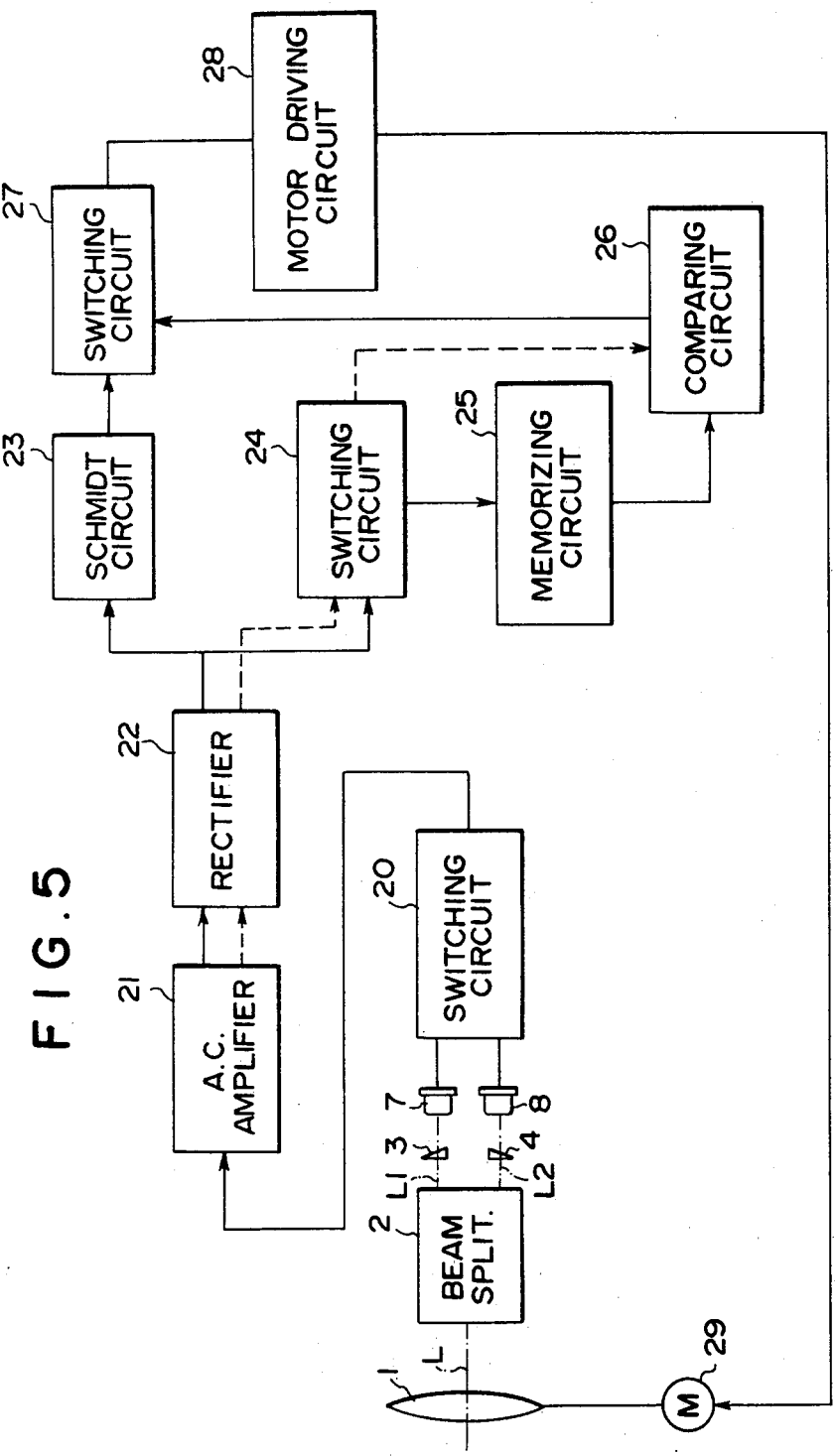
FIG. 5 is a block diagram showing the whole system of the automatic focusing device in accordance with the present invention.
Figure 6:
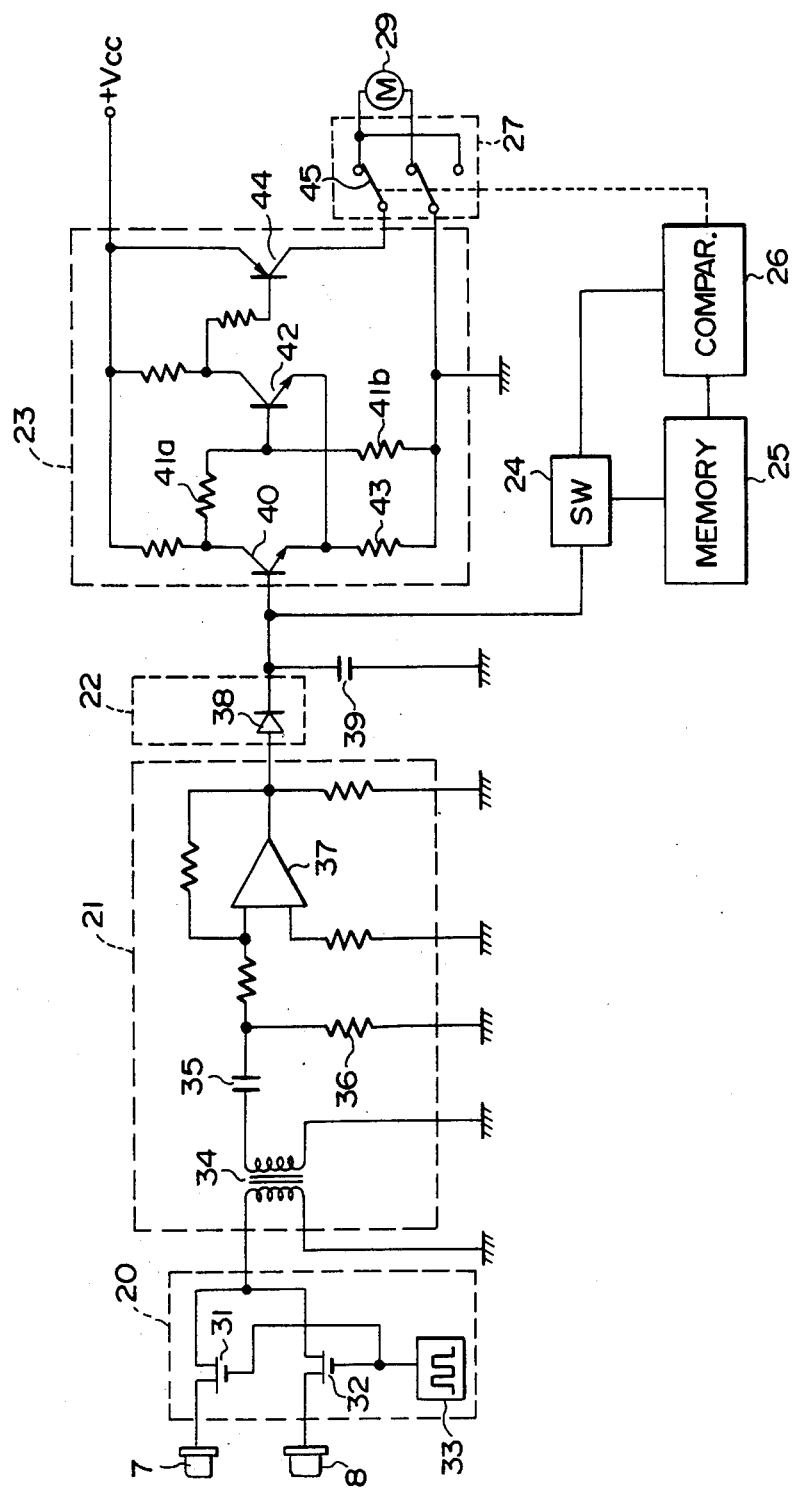
FIG. 6 is a detailed circuit view showing an example of the circuit employed in the automatic focusing device of the present invention.

A preferred embodiment of an electric circuit for automatically focusing an image by controlling the position of an objective in accordance with the output of photodetectors 7 and 8 will be described hereinbelow with reference to FIGS. 5 and 6. Behind an objective 1 is provided a beam splitter 2 to divide a light beam L into two light beams L1 and L2. In the light beams L1 and L2 are provided optical refractive elements 3 and 4 as shown in FIG. 1. The light beams through the optical refractive elements 3 and 4 are received by photodetectors 7 and 8, respectively. The outputs of the photodetectors 7 and 8 are connected with a change-over switching circuit 20 to pass the outputs from the photodetectors 7 and 8 alternately. An A.C. amplifier 21 is connected with the switching circuit 20 to amplify an alternating current component of the frequency equal to the switching circuit 20. The amplified A.C. component is rectified through a rectifier 22. The output of the rectifier 22 indicates the focusing condition. When the image is focused precisely on the refraction elements 3 and 4, the output of the rectifier 22 becomes zero. When the image is not focused thereon, the rectifier 22 shows a positive output having a level corresponding to the displacement of the image plane from the plane on which the refraction elements 3 and 4 are located. The output of the rectifier 22 is sent to a Schmidt circuit 23 connected with a motor driving circuit 28 by way of a direction controlling switching circuit 27 and also to a switching circuit 24. The direction control circuit 27 controls the direction of drive of a servomotor 29 by way of the motor driving circuit 28 and is connected with a comparator 26 which compares a signal from the switching circuit 24 with a signal from a memory 25. The switching circuit 24 first transmits the output of the rectifier to the memory 25 so that the latter memorizes the output and then transmits the output of the rectifier 22 to the comparator 26. The comparator 26 compares the output from the two circuits 24 and 25 and determines the direction in which the motor 29 should be rotated. When the output from the switching circuit 24 is higher than that from the memory 25 the motor 29 is rotated in the direction opposite to the direction in which it has been rotating up till that moment. When the output from the switching circuit 24 is smaller, the motor 29 is allowed to continue rotating in its rotating direction. Thus, when the output becomes zero, the motor 29 is stopped.

Now a circuit used in the above embodiment will be described in detail with reference to FIG. 6. The photodetectors 7 and 8 such as photodiodes are connected with a transformer 34 by way of a switching circuit 20 comprising field effect transistors 31 and 32 having different channel such as MOS FET (Metal Oxide Semiconductor) the gate of which is connected with an oscillator 33. The field effect transistors 31 and 32 are alternately turned on and off by the pulses given by the oscillator 33 since they have different channels. Therefore, the outputs of the two photodetectors 7 and 8 are alternately transmitted to the transformer 34. The transformer 34 picks up an A.C. component from the alternate switching circuit 20 including the field effect transistors 31 and 32. The A.C. component is filtered through a filter circuit consisting of a capacitor 35 and a resistor 36. Thus, the outputs of the photodetectors 7 and 8 are filtered to obtain only an A.C. component having a frequency over a predetermined level. The filtered output is put into an operational amplifier 37, and the output of the operational amplifier 37 is rectified through a diode 38. The rectified output is then smoothed by an integrating circuit consisting of a capacitor 39. The smoothed output is put into the base of the first transistor 40 of a Schmidt circuit 23 to turn on said transistor 40. Thereby, the current which has been flowing through resistors 41a, 41b and the base and the emitter of a second transistor 42 and a resistor 43 starts to flow through the collector and the emitter of the first transistor 40. Thus, the second transistor 42 is turned off. Therefore, the base potential of a third transistor 44 rises to turn on the same and the servomotor 29 is driven through a switch 45. The rectified output from the integrating circuit is sent to a switching circuit 24 at the same time to be memorized by a memory 25 and then put into the comparator 26 to be compared with the memorized output as mentioned hereinbefore. The output of the comparator 26 is transmitted to the switch 24 to reverse the direction of drive of the motor 29 when required. When the image plane is displaced far from the optical refractive elements 3 and 4, the output of the Schmidt circuit 23 is high to drive the motor 29 fast. When the image plane approaches the optical refractive elements 3 and 4, that is, as the image becomes sharper on the film in the camera, the speed of drive of the motor 29 is lowered, whereby the image is focused quickly and smoothly.

I claim:

1. An automatic focusing device for a camera or the like comprising in combination:
   an objective having an optical axis,
   a lens drive means for moving said objective back and forth along the optical axis thereof,
   a light beam dividing means provided behind and on the optical axis of said objective for dividing a light beam passing through the objective into first and second divided light beams, said light beam dividing means being located in front of the focal plane of said objective,
   an optical refractive element located substantially on the focal plane of said objective in said first divided light beam,
   a first photodetector located behind said optical refractive element to receive light through said optical refractive element,
   a second photodetector located in said second light beam at a position optically conjugate with said first photodetector with respect to said light beam dividing means,
   an A.C. component detecting circuit connected with said photodetectors,
   an alternating switching circuit connected between said A.C. component detecting circuit and said photodetectors for alternately transmitting the outputs of said first and second photodetectors to said A.C. component detecting circuit, and
   a control means connected between said A.C. component detecting circuit and said lens drive means for controlling said drive means in accordance with the output of said A.C. component detecting circuit so that the objective is stopped at a position where the A.C. component is zero.

2. An automatic focusing device for a camera or the like as defined in claim 1 further comprising a second optical refractive element located in said second divided light beam at a position optically conjugate with said first optical refractive element, the direction of refraction of the second optical refractive element with respect to image focused by the objective being different from that of said first optical refractive element.

3. An automatic focusing device for a camera or the like as defined in claim 1 further comprising focusing lenses located between said focal plane of the objective and the photodetectors, respectively, for focusing on the photodetectors the images of the images once focused on said focal plane.

4. An automatic focusing device for a camera or the like as defined in claim 1 wherein said light beam dividing means is a half transparent mirror.

5. An automatic focusing device for a camera or the like as defined in claim 1 wherein said light beam dividing means is a cemented prism assembly.

6. An automatic focusing device for a camera or the like as defined in claim 5 wherein said optical refractive element is a prism provided on an exit face of said cemented prism assembly.

7. An automatic focusing device for a camera or the like as defined in claim 6 wherein said optical refractive element is cemented on said cemented prism assembly.

8. An automatic focusing device for a camera or the like as defined in claim 6 wherein said optical refractive element is integrally formed with said prism assembly.

9. An automatic focusing device for a camera or the like as defined in claim 1 wherein said alternating switching circuit comprises a pair of field effect transistors of different channel connected between said photodetectors and said A.C. component detecting circuit, respectively, and the gates of the field effect transistors are connected with an oscillator.

* * * * *